(No Model.) 2 Sheets—Sheet 1.
E. B. BARKER.
PHOTOGRAPHIC CAMERA.
No. 407,275. Patented July 16, 1889.
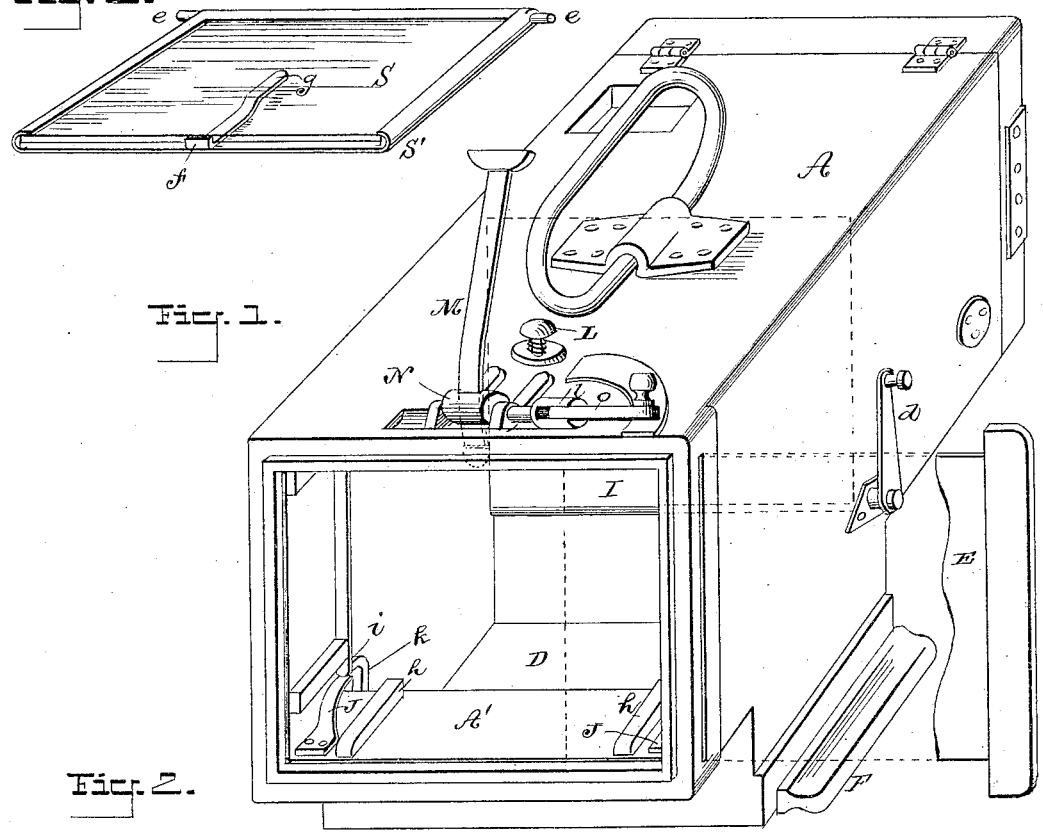
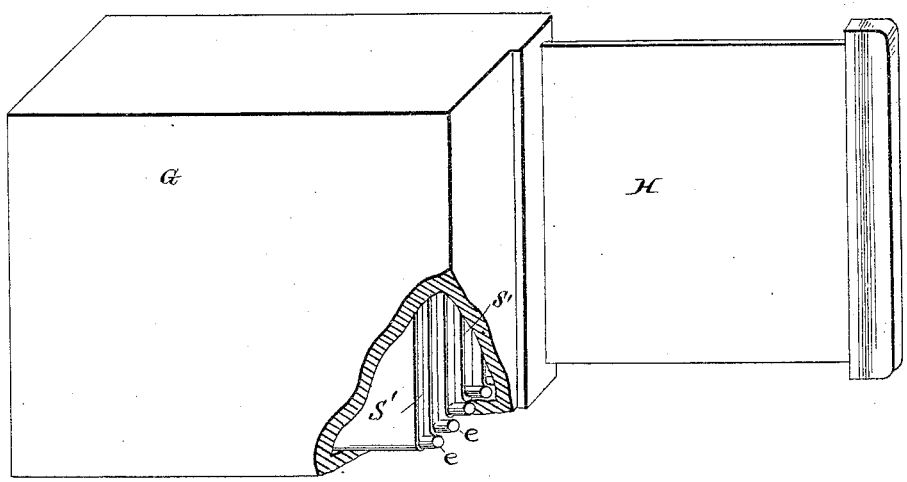
WITNESSES:
D. D. Mott
C. Sedgwick
INVENTOR:
E. B. Barker
BY Munn & Co.
ATTORNEYS.

(No Model.) 2 Sheets—Sheet 2.
E. B. BARKER.
PHOTOGRAPHIC CAMERA.
No. 407,275. Patented July 16, 1889.
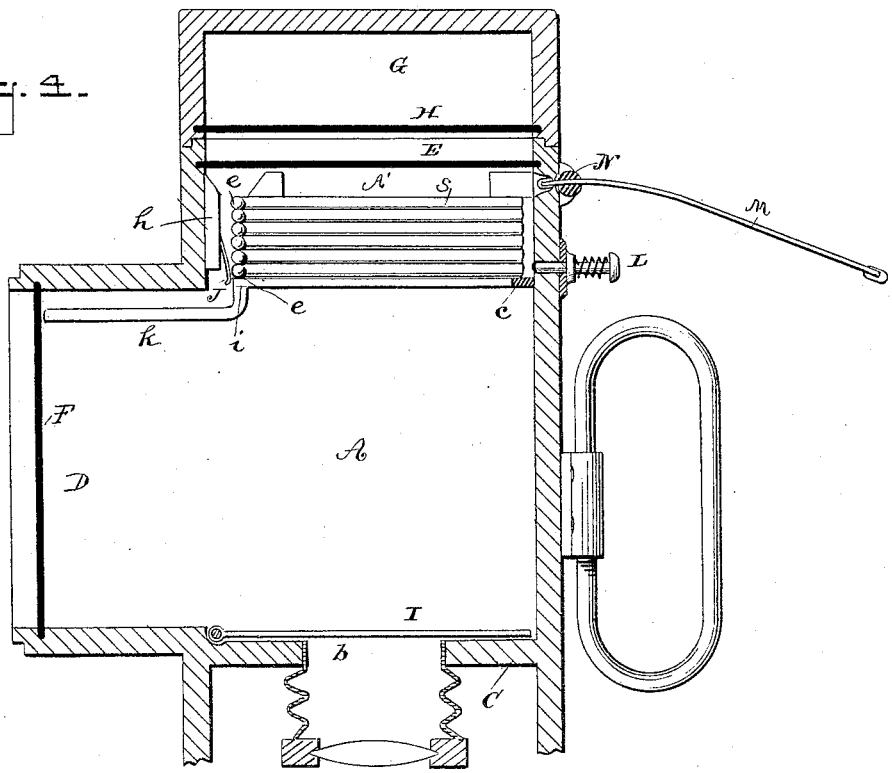
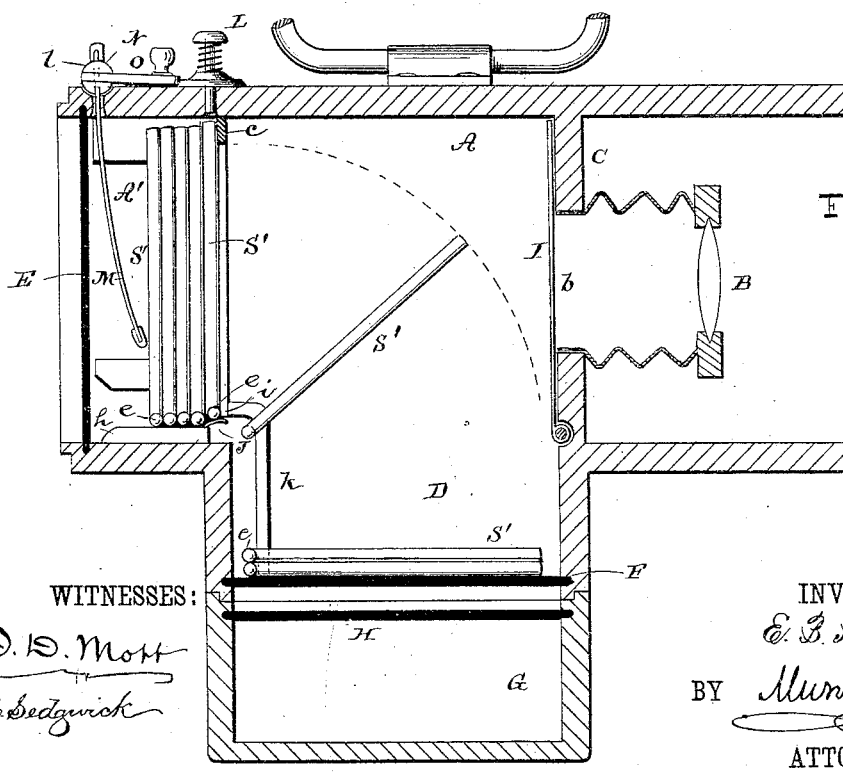
WITNESSES:
O. D. Mott
C. Sedgwick
INVENTOR:
E. B. Barker
BY Munn &Co.
ATTORNEYS.
N. PETERS, Photo-Lithographer, Washington, D. C.

UNITED STATES PATENT OFFICE.

ERASTUS B. BARKER, OF NEWARK, NEW JERSEY.

PHOTOGRAPHIC CAMERA.

SPECIFICATION forming part of Letters Patent No. 407,275, dated July 16, 1889.

Application filed April 11, 1887. Serial No. 234,443. (No model.)

*To all whom it may concern:*

Be it known that I, ERASTUS B. BARKER, of Roseville, in the city of Newark, in the county of Essex and State of New Jersey, have invented new and useful Improvements in Potographic Cameras, of which the following is a full, clear, and exact description.

This invention relates to magazine-cameras for photographic purposes—that is, photographic cameras in which a series of sensitized plates are stored one in rear of the other at the back of the camera, and are manipulated to expose them one after the other in succession for the purpose of taking a series of pictures, each on a separate plate, without opening the camera, and in which each plate, after exposure, is received within a receptacle or chamber out of the way of the other plates.

The invention consists in certain novel devices, constructions, and combinations of parts in a camera of this description, whereby the plates are readily adjusted to their places and after exposure are as readily released and thrown over into the receiving box or chamber, and light is effectually excluded from the plates excepting at the time of their successive exposure to take the image, substantially as hereinafter described, and pointed out in the claims.

Reference is to be had to the accompanying drawings, forming a part of this specification, in which similar letters of reference indicate corresponding parts in all the figures.

Figure 1 represents a view in perspective of a photographic camera embodying my invention and with its rear end exposed or thrown open. Fig. 2 is a perspective view, partly broken away, of a plate-holding box used in connection with the camera, with plates carried by suitable holders arranged therein. Fig. 3 is a perspective view of one of the plates and its holder. Fig. 4 is a vertical section of the camera, in part, when inverted or turned lens end downward for the purpose of passing the plates and their holders from the box in which they are carried into their position within the rear end of the camera, said box being shown as slipped on the back end of the camera-body for the purpose; and Fig. 5 is a vertical section of the camera, in part, when turned into operating position, with the plate-holding-box applied below the body of the camera to receive the plates and their holders as or after the pictures are taken, said view showing the plates as they are passed into a receiving-well in the bottom of the camera-body.

A is the body of the camera, provided with the usual or any suitable lenses, focusing devices, shutter proper, and other attachments at or within its front; but as these and other devices, the uses and operations of which are well understood, form no part of this invention, no particular references will here be made to them, except to indicate the position of the opening $b$ for the passage of light in rear of the lenses, one only B of which latter is here shown, and said opening represented as made in a board C at the back of the bellows.

D is a chamber or well in the bottom of the camera-body A, between its front and back ends, in rear of the apertured board C, and of only slightly greater horizontal area than the sensitized plates S and their holders S', also of sufficient depth to contain, when lying one upon the other, the whole series of plates with their holders. The back end of the body A, in rear of the well D, forms a similar-sized but upright chamber or space A', separated from the main portion of the camera-body by an upper strip or stop $c$ of any suitable kind, arranged approximately over or in line with the back wall of the well D. This upright chamber or space may be closed at its back by a slide E and the bottom of the well D be closed by a slide F, or either of these slides may be drawn out or removed, and in their place or in connection with them a plate-holding box G, which is also fitted with a slide H, be fitted over the bottom margin of the well D or rear margin of the upright chamber at the back of the body A, as and for the purposes hereinafter described.

The interior of the body A, immediately in rear of the apertured board or back C of the bellows-frame, is fitted with a pivoted supplementary shutter I, capable of operation by a handle $d$ from the exterior of the camera. This pivoted shutter, when thrown up, excludes light from passing through the lens-tube to the body of the camera in the rear, and when thrown down admits of the passage of light to the exposed front plate in the back of the camera, but closes the top of the well D, so as to exclude light from passing to the plates therein or in the box G when fitted thereto, and with the slides E and H drawn out.

Each plate-holder S' receives the sensitized plate S as a slide down within it, and is provided on opposite ends of its bottom with side trunnions or projections $e\ e$ and on its top with a lip $f$, and inside of it, back of the plate, with a spring $g$, all for purposes that will be hereinafter described. To put the plate in or out of its holder, the latter is sprung by pressing on its ends, to prevent the lip $f$ from interfering with movement of the plate in or out.

Upon or along the bottom of the camera-body, in rear of the well D, are opposite side guides or short rails $h\ h$, to direct the plates and their holders to their places when inserting them within the back end of the camera-body, and laterally exterior again to each of these guides $h$ is a spring-support J, for the forward plate-holder of the series in the camera. These spring-supports incline upwardly and forwardly, and only project at or near their free front ends above the level of the guides $h\ h$, and their front ends, when not depressed, close up against or under strips or stops $i$, extending down either side of the chamber A', and forming what may be termed "lower stops" for the trunnions of the front plate-holder. Immediately adjacent to these stops, or forming part of them, upon each side of the camera-body and arranged to lead down into the well D, is a guard or guide $k$, to direct the falling of the plate-holders S', with their plates, by their trunnions $e$, down into the well after exposure of the plates.

L is a spring trigger or button in the top of the camera-body, immediately over or in line with the position which the front plate-holder of the series in the camera occupies before or at the time of exposure.

M is a flat or slightly-bent spring for projecting each forward plate and holder thereof down into the well D after exposure of the plate. This spring, which is arranged to act upon the back plate-holder of the series in the rear end of the camera, is made capable of sliding up out of the way through the top of the camera-body to admit of the insertion of the plate-holders and their plates within the camera. Said spring, too, slides through a slotted cross shaft or rocker N, working in suitable bearings on top of the camera, and provided with a handle O, pivoted to it, as at $l$, so that said shaft or rocker N may be turned by said handle when it is in axial line with the rocker, as shown in Fig. 1, to permit of the sliding of the spring M up and down, and so that when slid down after the whole series of plate-holders with their plates have been introduced within the camera said spring will set backward or outward to act upon the rear plate-holder of the series. After, however, this adjustment has been made, then by turning the rocker N in a reverse direction by its handle O and by turning said handle on its pivot $l$ into a right or other angular position with the axis of the rocker, as shown in Fig. 5, tension will be thrown upon the spring M, and said spring be locked or secured to act with forcible pressure upon the rear one of the series of plate-holders in the back of the camera, to follow up the delivery of the plate-holders and their plates in succession into the well D.

The plate-holders S', containing the plates, are first inserted in the box G, plates downward, one on top of the other, and with the several trunnions $e$ of the different holders all on the same side of the box.

The operation is as follows: The slide F of the well D is closed, also the shutter I adjusted to close or cover the aperture $b$ back of the lenses, and the camera then inverted or turned with its front end down, as represented in Fig. 4. The box G, containing the series of plate-holders S' and their plates S is then fitted over the back open end of the camera-body, its slide H and the slide E of the camera withdrawn, when the plate-holders and their contained plates will drop into the space at the back end of the camera-body and the front one of said holders be made to rest upon the upper stop $c$ and the trunnions $e$ of said holder upon the forward free ends of the spring-supports J J and upon the lower stops $i$. After this the back slide E of the camera is closed and the empty box G removed from the back of the camera and fitted over or on the bottom of the well D, and the whole camera changed from its inverted position to its normal or regular one, as shown in Fig. 5. After focusing the image, which may be done by a focusing attachment connected with the camera, as in other cameras, and after the front shutter of the camera has been adjusted, the pivoted shutter I is thrown down, so as to uncover the aperture $b$, also to close the top of the well D against passage of light to any plates that may be therein, and the front or camera shutter proper is suitably manipulated to expose the front plate in the series of the back of the camera. After exposure, however, the supplementary shutter I is turned up, so as to close the aperture $b$, and then the trigger or button L depressed, so as to bear down upon the upper margin of the front plate-holder, which alone rests by its trunnions $e$ on the upper free forward raised ends of the spring-supports J J. This action of the trigger L will cause the spring-supports J J to be depressed below or away from the stops $i$ and the upper marginal portion of the front plate-holder S' to be pressed below the upper stop $c$, when the spring M, acting upon the rearmost plate-holder of all, will cause the front plate-holder, containing the exposed plate, to be thrown down face foremost into the well D, as shown in Fig. 5, the trunnions $e\ e$ of said forward plate-holder passing beneath the lower stops c and through the openings formed by the depression of the spring-supports J, and being guided by the guards or guides k, to restrain such plate-holder from being thrown too violently forward by the spring M and to direct it down into the well D. This operation is repeated for each plate in the back of the camera, as required, till all the plates in succession have been exposed and deposited with their plate-holders, one upon the top of the other, face downward, in the well D, only the forward one of said plate-holders riding at a time upon the spring-supports J, the other plate-holders in the rear of it resting on the rails or guides h h.

The lips f on the top of the plate-holders S' serve to keep the sensitized plates in the holders from being jerked out as said holders are projected by the spring M into the well D, and the springs g in the holders at the back of the plates prevent jar and damage to the plates as they fall into the well.

After the whole series of plate-holders and their plates have been deposited in the well D, the slide F in the well is drawn out, also, if closed, the slide H of the box G, to permit of all of the exposed plates and their holders being deposited within the box G, after which the slide H is closed and the box with its contents removed for subsequent development of the plates as required.

To produce the hereinbefore-described falling of the front plate-holder when liberated, to pass it from the chamber A' to the well D, it should be observed that the elevated free ends of the spring-supports J extend slightly beyond the rails or guides h, and that when said plate-holder is liberated by pressing on the trigger L the upper portion of said holder is released in advance of the lower part, and said lower part is detained and made to work as on the heel of a hinge by the trunnions e e coming in contact with the guards or guides k. This causes the plate-holder to fall over, as described.

Instead of the trigger or button L, any other suitable releasing device may be used, or in large cameras there may be two triggers arranged at a suitable distance apart, or a single trigger with a fork beneath arranged to press on the top of the front plate-holder at suitable distances apart.

The back ends of the guides h h are beveled to facilitate the charging of the chamber A with plate-holders and plates.

Having thus fully described my invention, I claim as new and desire to secure by Letters Patent—

1. A magazine-camera for photographic purposes in which are combined the following elements: a chamber in the rear end of the camera-body for storing the sensitized plates or their holders, upper and lower stops adapted to facially support the forward plate-holder, spring-supports arranged in proximity to the lower stops and adapted to sustain the front plate-holder, a spring adapted to force forward the series of plates, and a well to receive the plates successively after exposure, essentially as and for the purposes herein described.

2. In a magazine photographic camera, the combination of the chamber A' in rear of the camera-body, having an upper stop c and lower side stops i, the spring-supports J J, the guards or guides k, and the well or chamber D, substantially as specified.

3. In a magazine photographic camera, the combination, with the magazine or chamber A', of the rails or guides h h and the spring-supports J J, substantially as specified.

4. The trigger or button L, in combination with the spring-supports J J and the stops c i, essentially as described, and for the purposes set forth.

5. In a magazine photographic camera, the spring M, adapted to slide in and out of the chamber containing the plates to be exposed, also to set out in a backward direction relieved of tension, and to project or be adjusted forward subject to tension, substantially as specified.

6. The combination of the plate-holders S', provided with lower side trunnions e e, the spring-supports J J, and the stops c i, essentially as specified.

7. The spring M, in combination with the spring-supports J J and the stops c i, substantially as described.

8. The plate-holder S', adapted to receive the plate and provided with a covering-lip f, substantially as specified.

9. In a magazine photographic camera provided with a lower well or chamber for reception of the plates after exposure, the combination, with said well or chamber and with an apertured board in rear of the lenses of the camera, of a rocking supplementary shutter adapted to close in its different adjustments the aperture in said board and the well at its top, substantially as and for the purposes specified.

10. The removable plate-holding box G, having a slide H, in combination with the well D, its slide F, the chamber A', and slide E, essentially as described, and for use as herein set forth.

11. In a magazine photographic camera, the combination, with the chamber A', of the spring M, adapted to slide in and out of said chamber, the slotted rocker N, carrying said spring, and the pivoted handle O, for operation together substantially as and for the purposes specified.

ERASTUS B. BARKER.

Witnesses:
C. SEDGWICK,
A. GREGORY.